United States Patent [19]
Eastes et al.

[11] 4,270,944
[45] Jun. 2, 1981

[54] METHOD FOR PRODUCING CALCIUM BORATES

[75] Inventors: Walter L. Eastes, Granville; Anna Tarantino, Columbus, both of Ohio

[73] Assignee: Owens-Corning Fiberglas Corporation, Toledo, Ohio

[21] Appl. No.: 111,437

[22] Filed: Jan. 11, 1980

[51] Int. Cl.$^3$ .............................................. C03B 1/00
[52] U.S. Cl. .................................... 65/27; 65/134; 106/DIG. 8; 423/158; 423/278; 423/280
[58] Field of Search .................. 65/27, 134; 423/158, 423/278, 280; 106/DIG. 8

[56] References Cited

U.S. PATENT DOCUMENTS

| | | |
|---|---|---|
| 1,185,216 | 12/1913 | Liebknecht . |
| 1,200,739 | 12/1913 | Liebknecht . |
| 2,867,502 | 1/1959 | Strange et al. . |
| 3,026,178 | 3/1962 | Margrave et al. . |
| 3,032,391 | 5/1962 | Ball et al. . |
| 3,032,392 | 5/1962 | Nies et al. ............................ 423/280 |
| 3,088,801 | 5/1963 | Deyrup . |
| 3,450,497 | 6/1969 | Schumacher et al. ............... 423/278 |
| 4,074,991 | 2/1978 | Brzozowski et al. .............. 65/134 X |

FOREIGN PATENT DOCUMENTS

| | | | |
|---|---|---|---|
| 1633 | of 1854 | United Kingdom | 423/280 |
| 352137 | 7/1931 | United Kingdom | 423/280 |

OTHER PUBLICATIONS

"Kirk-Othmer Encyclopedia of Chemical Tech.," vol. 3, 2nd revised edition, p. 649.
"Boron, Metallo-Boron Compounds & Boranes," by R. M. Adams Manual of Mineralogy, -Dana, pp. 64, 65.

Primary Examiner—Arthur D. Kellogg
Attorney, Agent, or Firm—Ronald C. Hudgens; Patrick P. Pacella

[57] ABSTRACT

A process where calcium borates are precipitated from an aqueous solution of ulexite is disclosed. The ulexite is dissolved in hydrochloric acid. Calcium chloride then is added to the acid solution and then neutralized to precipitate the calcium borates. The calcium borates so produced are useful as glass forming, batch ingredients that can be compacted into agglomerates and preheated.

13 Claims, No Drawings

METHOD FOR PRODUCING CALCIUM BORATES

TECHNICAL FIELD

This invention relates to a process for producing calcium borates having particularly useful properties. Among these properties are a relatively high percentage of $B_2O_3$, a relatively low percentage or complete absence of $Na_2O$ and an unusually low water content.

BACKGROUND ART

Many industrial processes, of which glass making is illustrative, require appreciable quantities of $B_2O_3$ as an ingredient in a composition that is to be melted at relatively high temperatures in a furnace. The $B_2O_3$ may be supplied by many different borate compounds. The following is a list of some of the more readily available borate compounds:

| Mineral or Chemical Name | Chemical Formula |
|---|---|
| Boric acid | $H_3BO_3$ |
| Anhydrous boric acid | $B_2O_3$ |
| Anhydrous borax | $Na_2O \cdot 2B_2O_3$ |
| 5 Mol borax | $Na_2O \cdot 2B_2O_3 \cdot 5H_2O$ |
| Borax | $Na_2O \cdot 2B_2O_3 \cdot 10H_2O$ |
| Dehydrated Rasorite | $Na_2O \cdot 2B_2O_3$ |
| Probertite | $Na_2O \cdot 2CaO \cdot 5B_2O_3 \cdot 10H_2O$ |
| Ulexite | $Na_2O \cdot 2CaO \cdot 5B_2O_3 \cdot 16H_2O$ |
| Colemanite | $2CaO \cdot 3B_2O_3 \cdot 5H_2O$ |
| Calcined colemanite | $2CaO \cdot 3B_2O_3 \cdot H_2O$ |
| Sodium Perborate | $NaBO_2 \cdot H_2O_2 \cdot 3H_2O$ |

Because of the disadvantages of relatively large amounts of water or soda in many of these compounds, a large potential demand for pure calcium borates exists. Colemanite and especially calcined colemanite are desirable for glass making processes particularly where compacting glass batch is employed.

DISCLOSURE OF INVENTION

According to this invention, calcium borates are precipitated from an aqueous ulexite solution. The ulexite is dissolved in a mineral acid such as hydrochloric acid. Calcium chloride brine is then added and the pH is adjusted to precipitate hydrated calcium borates. pH adjustment can be carried out by the addition of sodium hydroxide. In one embodiment, the precipitate can be dried if less hydrated calcium borates are desired. The calcium borates so produced have properties similar to colemanite and calcined colemanite.

This method of precipitating calcium borates from solutions of ulexite is desirable because of the increasing use of compacting glass batch in the glass industry. Sources of boron other than Turkish colemanite now used in compacting glass batch will be necessary in order to avoid dependence upon a single boron source. Borax, boric acid and anhydrous boric acid (or boric oxide) are unacceptable in some compacting systems because they dissolve in water or decrepitate when compacted and preheated. In other cases, the cost of the calcined product is prohibitive.

Other halides that are very soluble in water can be employed in this invention. Calcium iodide and calcium bromide which are very soluble in water, are included within the scope of this invention.

Calcium fluoride, on the other hand, is very insoluble in water and would not be included. Other halide salts which are included are those of aluminum, magnesium, barium and the like.

Mineral acids other than hydrochloric acid can be employed in this invention. Other common mineral acids include sulfuric acid, nitric acid and the like.

The concentration of mineral acid employed in this invention can vary widely. Generally, however, the mineral acid has a concentration ranging from 0.2 to 3.0 M, preferably 0.3 to 2.0 M.

The mole ratio of calcium chloride and ulexite employed in this invention also can vary widely. Generally, however, the calcium chloride calculated as Ca and the ulexite calculated as B are present in initial amounts having a molar ratio of Ca/B ranging from 0.1 to 1.0, preferably 0.1 to 0.4.

The concentration of calcium chloride and ulexite can vary widely. Generally, an amount necessary to dissolve in solution and meet the above mole ratio is required. Otherwise the concentration of each material can be as weak or as strong as desired.

The properties of compacted glass batch produced from these calcium borates would compare favorably with those compacted from standard glass batches. In order to be useful for glass batch compacting, the calcium borate must first be dried at about 100° C. for an hour to remove loosely bound water. The small amount of remaining water will not be expected to affect the compacting process.

BEST MODE OF CARRYING OUT INVENTION

EXAMPLE I

Procedure for Producing a Calcium Borate from Ulexite.

1. Heat a 0.5 M HCl solution to just below boiling and add as much ulexite as will dissolve. This is approximately 82 grams of ulexite per liter.
2. Filter the solution to remove any undissolved ulexite, sand, etc.
3. To the filtrate, add enough of a $CaCl_2$ solution to replace all of the sodium in ulexite. For example, for the compounds in Table 1, 75 ml, 125 ml, and 250 ml of a 0.27 M $CaCl_2$ solution were added to 200 ml of the ulexite solution.
4. Add enough 1 M NaOH to bring the final pH of the solution to between 7 and 9. A white precipitate forms immediately as the NaOH is added.
5. Filter the precipitate and wash several times with water.
6. Dry the precipitate to constant weight in a 110° C. oven (2-3 hours).

The ulexite used in these experiments was Boratos Del Peru ulexite. Analysis showed the ulexite to have the oxide composition 6.9%, $Na_2O$, 9.9% CaO, and 41.8% $B_2O_3$.

Table 1 shows the compositions of the calcium borates which were produced. Sodium, boron, calcium, and chlorine were analyzed by the procedures described by the following Examples. The percent of water was determined from the weight loss after heating the sample to 500° C. for one hour.

The first number in Table 1 is the molar ratio of the calcium which was added as calcium chloride to the boron present in the ulexite. These three ratios are approximately that necessary for replacing every 2 moles of sodium in the ulexite with 1 mole of calcium from the calcium chloride solution, for replacing 1 mole of sodium with 1 mole of calcium, and for replacing 1 mole of sodium with 2 moles of calcium, respectively. Although different amounts of calcium were added to the ulexite, only one calcium borate was produced. Its x-ray diffraction pattern shows it to be amorphous. The most likely composition for it is $3CaO \cdot 5B_2O_3 \cdot 2H_2O$.

All of the calcium borates produced had a small amount of chlorine and sodium contaminate. This is probably from unreacted $CaCl_2$ or $NaCl$ which is formed as a by-product in the reaction. The concentration of these can be reduced still further by washing the precipitate.

The yield of the product, calculated in terms of the boron content, is dependent on the pH of the solution as is shown in Table 2. Adjusting the pH is one way this process might be optimized.

TABLE 1

Calcium Borates Produced from Ulexite.

| Initial Conditions | 1 | 2 | 3 |
|---|---|---|---|
| Ca added molar ratio B initial Ca/B | .10 | .17 | .34 |
| Analysis of product | | | |
| $B_2O_3$ | 48.7 | 46.7 | 49.0 |
| CaO | 28.3 | 28.1 | 30.2 |
| Na | .9 | 1.0 | .2 |
| Cl | 1.0 | 2.0 | .9 |
| $H_2O$ | 16.8 | 18.4 | 16.7 |
| | 95.7% | 96.2% | 97.0% |

TABLE 2

Effect of Solution pH on Yield.

| Final Solution pH | Yield |
|---|---|
| 7.5 | 28% |
| 8.1 | 55% |

EXAMPLE II

Procedure for the determination of calcium.

(1) Dissolve the sample in distilled water or in a few ml of dilute hydrochloric acid if necessary.
(2) Dilute to 50 ml; add 1 ml of buffer solution and 4 drops of Eriochrome Black-T indicator solution.
(3) Titrate with a standardized EDTA solution to a red to blue color change.

The buffer solution mentioned here is prepared by dissolving about 7 grams of $NH_4Cl$ in 60 ml of concentrated $NH_4OH$ solution and diluting it in 100 ml of distilled water.

The EDTA solution is made by dissolving 18 grams of the disodium salt of ethylenediaminetetraacetic acid in somewhat less than 1000 ml of distilled water. Then 0.3 grams of $MgCl_2 \cdot 6H_2O$ are dissolved in it and the solution is made up to 1000 ml ml.

The EDTA solution is standardized by dissolving accurately weighted 0.2 gram samples of dry $CaCO_3$ in a small amount of HCl solution. They are then titrated with the EDTA solution following the above procedure starting at step (2).

EXAMPLE III

Procedure for Determination of Boron

This procedure applies to the determination of boron in borate solutions or in borates which are soluble in water or in dilute acid. If the borate is already in solution, proceed to step (3).

(1) Accurately weigh a 0.2 gram sample of the borate to be determined.
(2) Add 2 ml of distilled water and 2 ml of 0.1 M HCl solution. Heat to dissolve. If it fails to dissolve, dilute to 100 ml and heat. In no case should the solution come to a boil.
(3) Dilute the solution to 100 ml if not already and insert the pH meter probes.
(4) Titrate with 0.1 M HCl to the sharp end point at pH 5.4. If the end point is overshot, titrate back with 0.1 M NaOH. The amounts of acid and base need not be recorded.
(5) Add several grams of mannitol and titrate with standardized 0.1 M NaOH to pH 6.8.
(6) When 6.8 is reached, add more mannitol, which usually causes the pH to drop.
(7) Continue to titrate to pH 6.8.
(8) Repeat steps (6) and (7) until the addition of mannitol does not change the pH.
(9) Record the volume of 0.1 M NaOH used in steps (5) through (8). Two mols of NaOH are equivalent to one mole of $B_2O_3$ in the original sample.

The 0.1 M HCl and NaOH are conveniently standardized by titrating an accurately weighed sample of dry $Na_2CO_3$ with the HCl and then by titrating the NaOH with the HCl using a pH meter.

EXAMPLE IV

Procedure for Determination of Chloride (1) Accurately weigh a 0.1 gram sample of the unknown.
(2) Dissolve it in 50 ml of dilute HNO3 and dilute to 100 ml.
(3) Add 0.1 M AgNO3 dropwise with stirring.
(4) Digest at about 60° C. on a hot plate until the precipitate tends to become flocculent and settle to the bottom.
(5) Add more AgNO3 solution until no more precipitate is formed.
(6) After digesting for a few more minutes, filter onto weighed filter paper under suction.
(7) Dry the filter paper and precipitate quickly on a warm hot plate and weigh.

One mole of the AgCl precipitate is equivalent to one mole of Cl in the sample.

EXAMPLE V

Procedure for Determination of Sodium

Sodium was analyzed on a type 300 Betaprobe manufactured by Telser Instruments of Oxford, England. The Betaprobe, an electron excited X-ray fluorescence spectrometer, was standardized with samples of colemanite, ulexite and 5 mole borax of known composition. The intensity of the sodium peak as a function of sodium concentration for the standards was fit to a straight line and the concentration of sodium in the unknown was interplated from this.

INDUSTRIAL APPLICABILITY

Methods are known in the art for glass manufacturing wherein glass-forming, batch ingredients are compacted into agglomerates and these agglomerates then are heated in a chamber by a direct contact with flue gases from a glass melting furnace so as to produce free-flowing agglomerates which then conveyed and discharged to the glass melting furnace. These agglomerates are composite, integral, self-supporting masses consisting essentially of all the substantial batch materials and may take the form of balls, extrusions, discs, briquettes, and pellets. The pellets are discharged to a vertical bed contained within a chamber and furnace flue gases pass, in direct contact with and countercurrently to, downwardly moving pellets of the bed to dry and preheat them. The process is carried out at a temperature and for a time insufficient to fuse or melt substantial amounts of the agglomerates. The agglomerates usually will start to fuse together when their temperature reaches 1,400° or 1,500° F., so contact is discontinued at or below these temperatures.

We claim:

1. A method for producing calcium borates comprising the steps of:
    forming an aqueous solution of ulexite and mineral acid;
    adding calcium chloride; and
    neutralizing the acid solution to precipitate the calcium borates.

2. A method according to claim 1 wherein the neutralizing is carried out by adjusting the pH to range between 7 and 9.

3. A method according to claims 1 or 2 including the step of drying the precipitate.

4. A method according to claim 1 wherein the calcium chloride calculated as Ca and the ulexite calculated as B are present in initial amounts having a molar ratio of Ca/B ranging from 0.10 to 1.0.

5. A method according to claim 4 wherein the ratio of Ca/B ranges from 0.1 to 0.4.

6. A method according to claim 1 wherein the mineral acid has a concentration ranging from 0.2 to 3.0 M.

7. A method according to claim 1 wherein the mineral acid has a concentration ranging from 0.3 to 2.0 M.

8. A method according to claim 1 wherein the mineral acid has a concentration of 0.5 M.

9. A method according to claim 2 wherein the pH is adjusted with a NaOH solution.

10. A method according to claim 3 wherein the precipitate is dried at 110° C. for 2 to 3 hours.

11. A method according to claim 1 wherein the mineral acid is hydrochloric acid.

12. A method for preparing a calcium borate-containing glass fiber forming glass batch comprising introducing calcium borate-containing batch ingredients into a compacting zone, compacting the ingredients with sufficient water to produce agglomerates containing 5% to 20% by weight of water, and heating the agglomerates to a temperature and for a time sufficient to melt or fuse the agglomerates;
    wherein the calcium borate is prepared by forming an aqueous solution of ulexite and hydrochloric acid; adding calcium chloride; and neutralizing the acid solution to precipitate the calcium borates.

13. A process according to claim 12 including the subsequent step of charging the agglomerated glass batch to a glass melting furnace.

* * * * *

UNITED STATES PATENT AND TRADEMARK OFFICE
CERTIFICATE OF CORRECTION

PATENT NO. : 4,270,944
DATED : June 2, 1981
INVENTOR(S) : Walter L. Eastes and Anna Tarantino It is certified that error appears in the above—identified patent and that said Letters Patent is hereby corrected as shown below:

At column 3, line 54, "ml" (first occurrence), should be deleted.

At column 6, line 21, the word "sufficient" should be changed to "insufficient".

Signed and Sealed this

Fourth Day of August 1981

[SEAL]

Attest:

Attesting Officer

GERALD J. MOSSINGHOFF

Commissioner of Patents and Trademarks